US012215980B2

(12) United States Patent
Pallemulle et al.

(10) Patent No.: US 12,215,980 B2
(45) Date of Patent: Feb. 4, 2025

(54) GRADUATED NAVIGATION FOR ITEM SERVICING

(71) Applicant: Amazon Technologies, Inc., Seattle, WA (US)

(72) Inventors: Sajeeva L. Pallemulle, Bellevue, WA (US); James Walt Hammans Stallings, Austin, TX (US); Margo Conner, Portland, OR (US); Niranjan Dharmarajan, Sammamish, WA (US); Alexander Blackstock, Mercer Island, WA (US); Abhijeet Rajiv Deshmukh, Seattle, WA (US); Jonathan Paul McCabe, Los Gatos, CA (US); Randy Fussell, Bellevue, WA (US); Iliya Koreshev, Jonestown, TX (US)

(73) Assignee: Amazon Technologies, Inc., Seattle, WA (US)

( * ) Notice: Subject to any disclaimer, the term of this patent is extended or adjusted under 35 U.S.C. 154(b) by 227 days.

(21) Appl. No.: 18/079,605

(22) Filed: Dec. 12, 2022

(65) Prior Publication Data

US 2025/0012577 A1    Jan. 9, 2025

(51) Int. Cl.
*G01C 21/34* (2006.01)
*G01C 21/36* (2006.01)

(52) U.S. Cl.
CPC ..... *G01C 21/3415* (2013.01); *G01C 21/3476* (2013.01); *G01C 21/3632* (2013.01); *G01C 21/3644* (2013.01); *G01C 21/367* (2013.01); *G01C 21/3697* (2013.01)

(58) Field of Classification Search
CPC ............ G01C 21/3415; G01C 21/3476; G01C 21/3632; G01C 21/3644; G01C 21/367; G01C 21/3697
See application file for complete search history.

*Primary Examiner* — Mathew Franklin Gordon
(74) *Attorney, Agent, or Firm* — Kilpatrick Townsend & Stockton LLP

(57) ABSTRACT

Techniques for graduated navigation displayed on an electronic device used in servicing items for users are described herein. For example, the electronic device can receive a first set of directions for moving towards a first geolocation associated with a service address using a first navigation method for presentation. The electronic device can transition from the first set of directions to a second set of directions in response to detecting a transition trigger associated with a second geolocation. The transition can involve ceasing providing the first set of directions for presentation. The transition can also involve providing the second set of directions for moving from the second geolocation towards the service address using a second navigation for presentation.

20 Claims, 11 Drawing Sheets

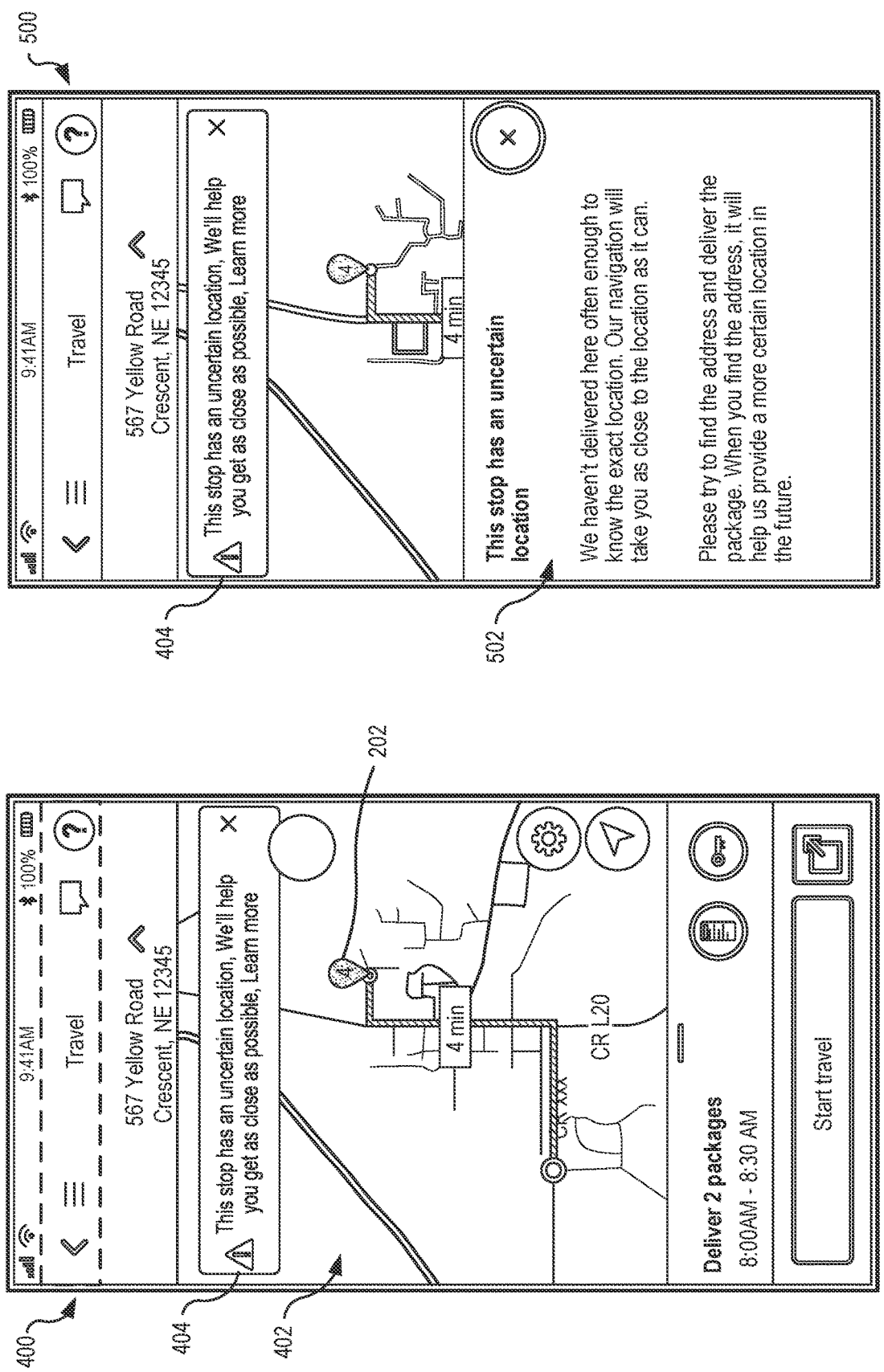

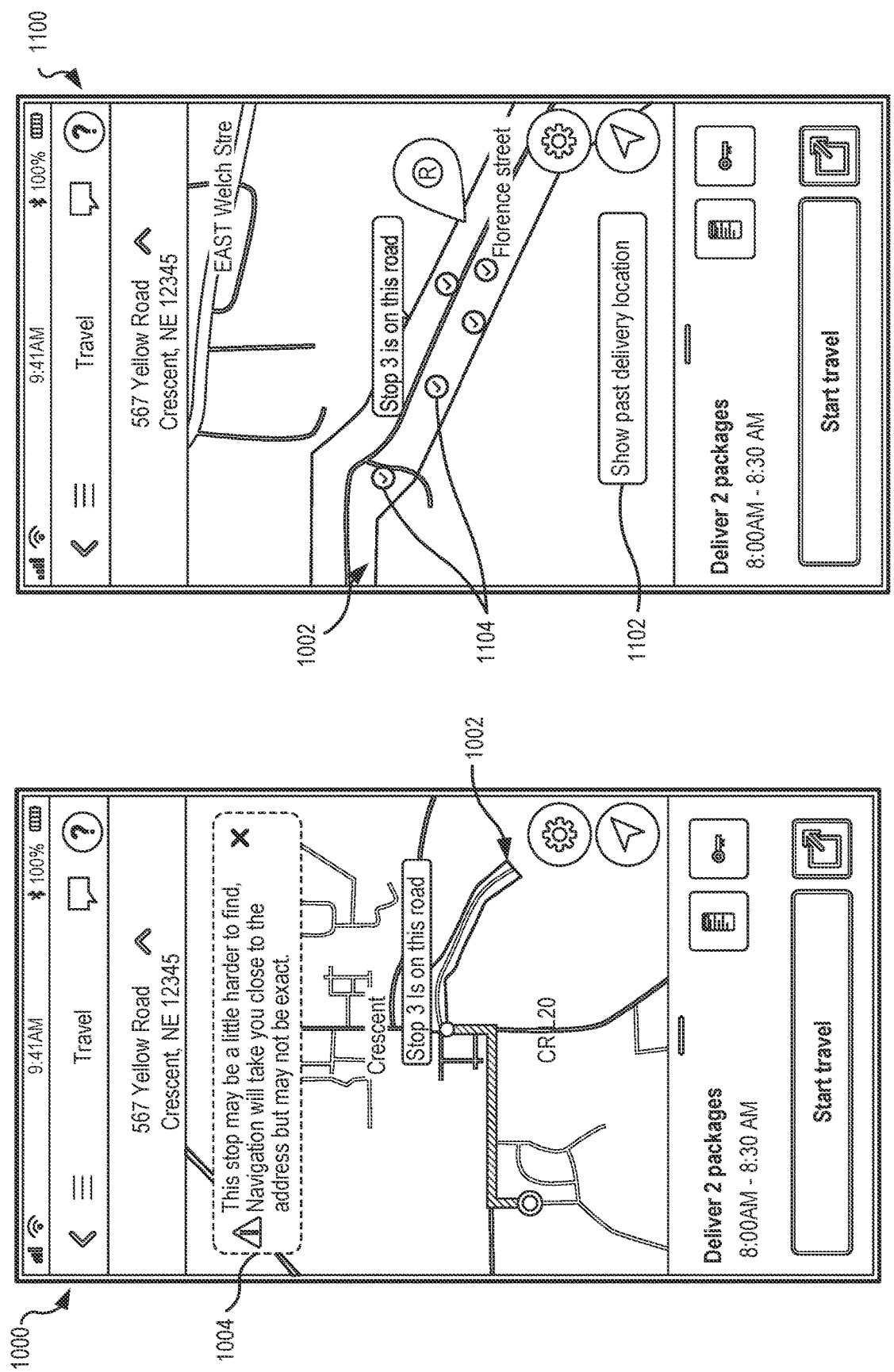

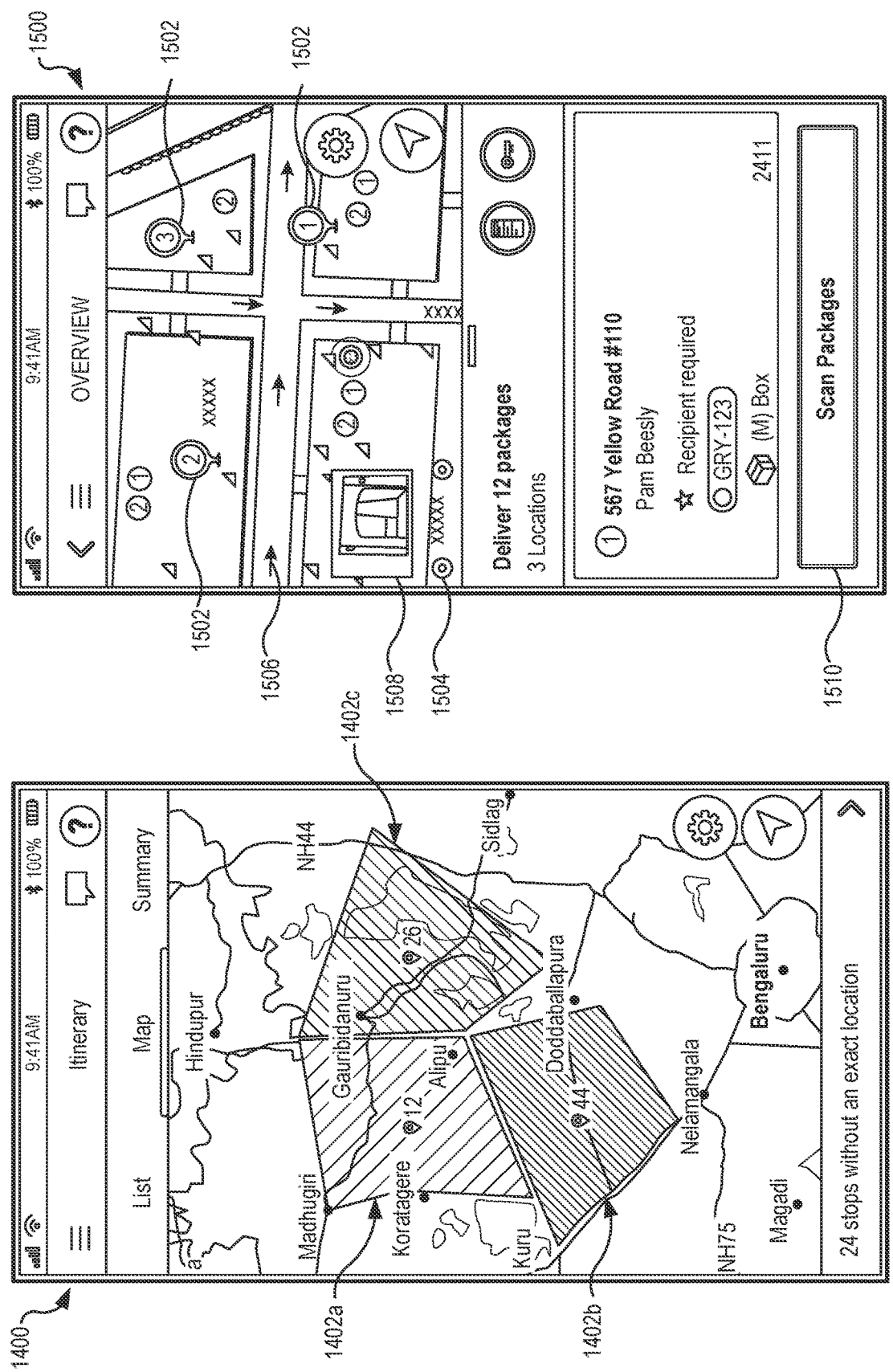

GRADUATED NAVIGATION FOR ITEM SERVICING

BACKGROUND

Different computing services are available to improve user experience with item deliveries. For instance, a driver can receive a map of the delivery location on their device. In some areas, comprehensive maps or delivery instructions may not be available for display on the device.

BRIEF DESCRIPTION OF THE DRAWINGS

Various embodiments in accordance with the present disclosure will be described with reference to the drawings, in which:

FIG. 4 illustrates an example user interface for an electronic device displaying graduated navigation, according to at least one example;

FIG. 5 illustrates an example user interface for an electronic device displaying graduated navigation, according to at least one example;

FIG. 10 illustrates an example user interface for an electronic device displaying graduated navigation, according to at least one example;

FIG. 11 illustrates an example user interface for an electronic device displaying graduated navigation, according to at least one example;

FIG. 14 illustrates an example user interface for an electronic device displaying graduated navigation, according to at least one example;

FIG. 15 illustrates an example user interface for an electronic device displaying graduated navigation, according to at least one example;

DETAILED DESCRIPTION

Figure 1:
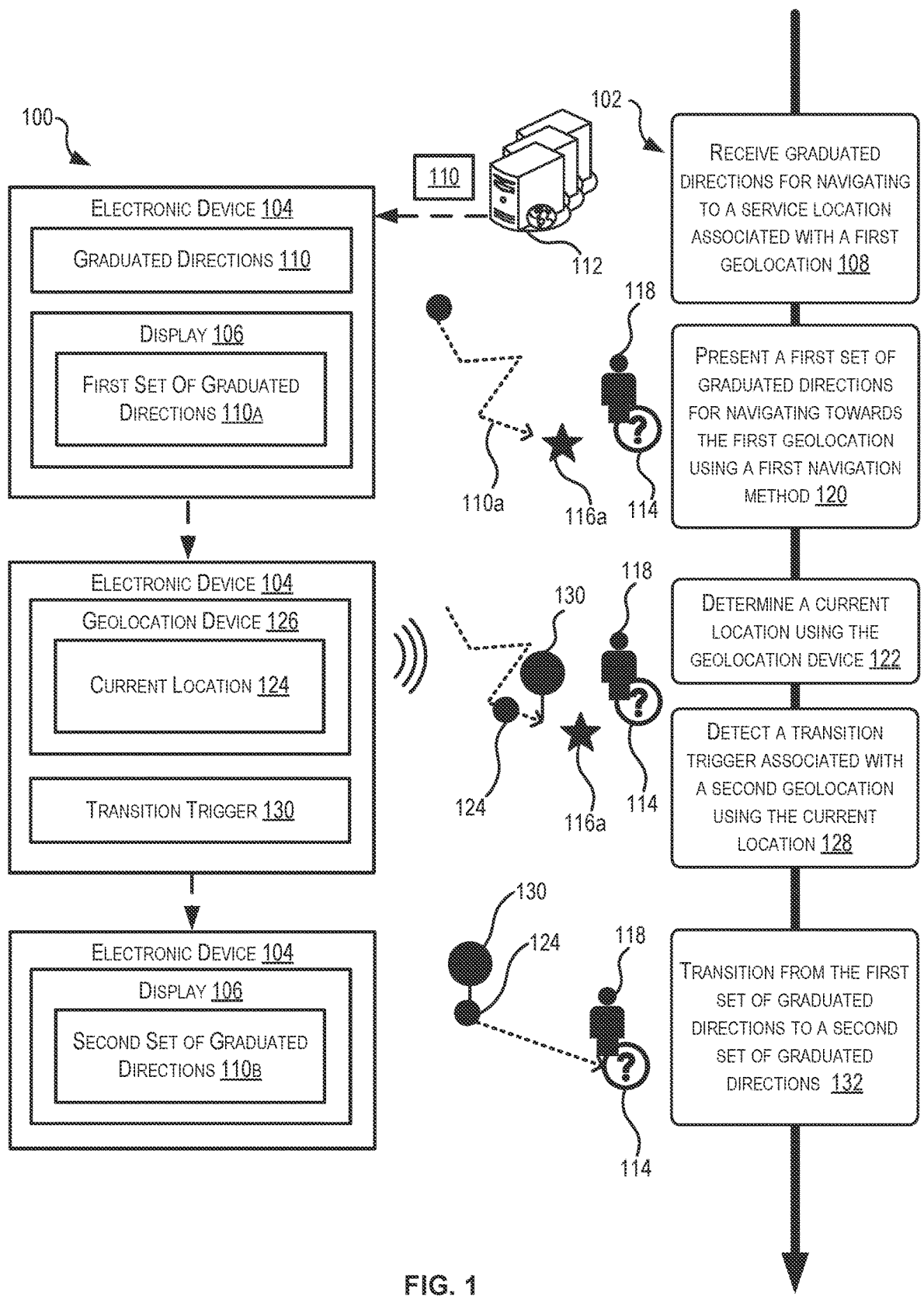
FIG. 1 illustrates an example block diagram and associated flowchart showing a process for implementing techniques relating to transitioning from a first set of graduated directions to a second set of graduated directions displayed on an electronic device, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples described herein are directed to, among other things, presenting graduated navigation on an electronic device to aid a user in navigating to service addresses in areas where road networks are not fully mapped. Currently, both consumer and commercial navigation solutions used by users such as delivery drivers offer turn-by-turn navigation experiences to guide users to destinations. In certain geographic regions, the road networks are sufficiently mapped and addresses sufficiently discernable to enable turn-by-turn navigation. But in some areas, such as rural areas and other areas where road networks may not be fully mapped, or when the address geolocation may not be precisely known, turn-by-turn navigation may not be available. In such areas, this can force users to take on time-consuming cognitive and behavioral tasks associated with searching for an unknown location in an unknown area. For example, users may spend extra time searching for addresses or delivering to incorrect addresses because little to no information about the area is presented to the user. In some cases, turn-by-turn navigation may be available for addresses or areas with low-confidence geographical data, but the low confidence level of the data may not be shown to the user. The user may follow turn-by-turn navigation to a potential location of an address that may be inaccurate, causing the user to take longer to recognize the error than if they had been aware of the low confidence level before departure. To address these concerns and others identified herein, graduated navigation, which provides turn-by-turn navigation with more traditional wayfinding navigation, may be implemented. In graduated navigation, turn-by-turn navigation can be used for at least a part of a user's journey to an address, with a transition to wayfinding navigation once turn-by-turn navigation can no longer be confidently provided. A first part of graduated navigation can involve guiding drivers to the closest possible known location. For example, turn-by-turn navigation can be used to guide a driver to a known road on which an address might be located, or a well-known landmark in a neighborhood near the address. After navigating to the known location (e.g., a transition trigger), the graduated navigation can transition to a wayfinding navigation method. For example, the driver can self-navigate to the service address from the transition trigger in the final stretch of the journey (e.g., a delivery address of a customer). Thus, although the area may not be fully mapped, the driver is routed as far as possible in the direction of the service address using turn-by-turn navigation, before switching to wayfinding navigation method.

Turning now to a particular example, a user device for a delivery driver can display a route for delivering an item to a customer at a delivery address. Before the delivery driver starts the route, the user device can display a message informing the delivery driver that the route will include graduated navigation. The delivery driver can then begin navigating towards the delivery address using the displayed route. Initially, the route can include turn-by-turn navigation that displays the current location of the delivery driver and the nearby area. The turn-by-turn navigation can instruct the delivery driver to make one or more turns on particular roads until the user device has determined that the current location of the delivery driver has reached a predefined location. This predefined location may be a known location that is near the delivery address. For example, the predefined location may be a landmark, a street, a region of interest, etc. The user device may then transition to displaying wayfinding navigation and instructing the delivery driver to identify the location of the address. Wayfinding navigation can involve displaying any known information about the delivery address. For example, the user device may highlight a road on which the delivery address is located. In another example, the user device may display previous delivery address locations in the nearby area. After the delivery driver locates the delivery address and performs the delivery, the user device can record the location of the delivery. Records associated with the customer can be updated with the location. In some examples, this can allow turn-by-turn navigation to be performed for the entire route to the delivery address for future deliveries.

Techniques described herein improve the functioning of electronic devices that provide displays to users navigating to unknown locations. Previously, users may be entirely responsible for navigating regions that do not have sufficient geographic data for providing turn-by-turn navigation. Even when geographic data is sufficient to make turn-by-turn navigation available, such displays may display low-confidence data without indications of the confidence level. Graduated navigation can increase transparency around the confidence levels for address locations, enabling users to make more informed and adaptive decisions. Directing the user to a well-known location first may reduce service time (e.g., item delivery or pickup time) by reducing the amount of self-navigation performed by the user. Additionally, as addresses are located in the region and corresponding geographic data is used to update maps of the area, turn-by-turn navigation to transition triggers that are closer to addresses can be determined.

In addition, techniques described herein can provide an improvement involving refinement of geographical data in a database used to provide navigation instructions. For example, initially, address data for a geographic region may be obtained from a third party. In some cases, the address data may be inaccurate or only partly trustworthy. Thus, turn-by-turn navigation to the addresses identified by the address data may also be inaccurate (e.g., resulting in users arriving at incorrect locations). Using the techniques described herein, users can register geolocations of addresses determined using graduated navigation. The address data in the database can be updated to include or correct the location data (e.g., geocode data in the form of latitude and longitudes or other comparable approach) used to identify the addresses. The geographical data can therefore be refined over time as more addresses are precisely located by users within the geographic region. This can increase confidence in the address data for the geographic region. Eventually, the map of the region may be fully updated with the trusted address data in the database, and turn-by-turn navigation can be used without any wayfinding navigation.

Turning now to the figures, FIG. 1 is an example block diagram 100 and associated flowchart showing a process 102 for implementing techniques relating to transitioning from a first set of graduated directions 110a to a second set of graduated directions 110b displayed on an electronic device 104, according to at least one example. The diagram 100 depicts devices, objects, and the like that correspond to the process 102. The process 102 can be performed by the electronic device 104, which includes a display 106 on which navigation information can be presented to be used to navigate to a particular location. In some examples, the electronic device 104 may be onboard a service vehicle (e.g., an onboard navigation device, an onboard computer, etc.), or may be a smartphone or other handheld user device used by a driver in a service vehicle (e.g., a delivery vehicle).

The process 102 may begin at block 108 by the electronic device 104 receiving graduated directions 110 from a service provider 112. The service provider 112 can be a server, such as an edge server, a set of servers in a cloud computing service, a virtual computing instance, etc. that is remote. The electronic device 104 may receive the graduated directions 110 from the service provider 112 during navigation. In other examples, the graduated directions 110 may be downloaded from the service provider 112 for offline use during navigation. The graduated directions 110 can be used for navigating to a service location 114 associated with a first geolocation 116a. For example, the electronic device 104 may be used by a delivery driver to navigate to the service location 114 (e.g., a delivery location) to deliver an item to a user 118 at the service location 114. The exact coordinates of the service location 114 may be unknown (e.g., a latitude and longitude may not be determinable for the service location 114 with a certain level of confidence). Thus, the first geolocation 116a associated with the service location 114 may be a geographical area that the service location 114 is likely located within, such as a city, an area corresponding to a zip code, a county, a neighborhood, etc. For example, the address of the service location 114 may include a zip code. The first geolocation 116a may therefore include the geographical area associated with the zip code.

At block 120, the electronic device 104 can present a first set of graduated directions 110a from the graduated directions 110 received from the service provider 112 on the display 106. The first set of graduated directions 110a can be used to navigate towards the first geolocation 116a using a first navigation method. One example of the first navigation method can include turn-by-turn (TBT) navigation. For example, TBT navigation can involve displaying a map of the local area in which the service driver is travelling, the current location of the service driver on the map, and instructions for upcoming turns that update as the service driver navigates toward the first geolocation 116a. The display 106 may direct the service driver to drive in a particular direction and to turn at a particular location. The display 106 may also include a distance between the service driver and the turn. The distance can decrease as the service driver approaches the location of the turn. After the service driver makes the turn at the particular location, the electronic device 104 can display the next upcoming turn and the distance between the service driver and the upcoming turn. This process can continue until the service driver arrives at a destination. In some examples, before the electronic device 104 presents the first set of graduated directions 110a, the electronic device 104 may present a contextual message on the display 106. The contextual message can indicate that navigation to the service location 114 will include the graduated directions 110. Thus, the service driver can be made aware that the first set of graduated directions 110*a* will eventually be replaced with another set of graduated directions.

At block 122, the electronic device 104 can determine a current location 124 of the electronic device 104 using a geolocation device 126. The geolocation device 126 may track the current location 124 of the electronic device 104 as the electronic device 104 moves toward the first geolocation 116*a*. The electronic device 104 may continuously update the display 106 to show the current location 124 on the display 106. Additionally, the electronic device 104 can determine changes to display for the first set of graduated directions 110*a* as the electronic device 104 moves based on the current location 124.

At block 128, the electronic device 104 can detect a transition trigger 130 using the current location 124 of the electronic device 104. The transition trigger 130 can be associated with a second geolocation. The second geolocation may be a location that is well-known. For example, the transition trigger 130 can be associated with an intersection, a region of interest, a point of interest, an administrative region with a known location, and/or any other suitable geolocation that is adjacent to and/or otherwise associated with the service location. A region of interest can be a known region, such as a neighborhood or section of a street. A point of interest can be a known point, such as a neighborhood entrance, a landmark, a building, etc. An administrative region may be a region determined by a government, such as a county or district.

The electronic device 104 can determine that the current location 124 of the electronic device 104 is at or near the transition trigger 130. For example, the electronic device 104 may detect that the current location 124 is within a threshold distance from the first geolocation 116*a*. That is, the current location 124 may be within a threshold distance from a region in which the first geolocation 116*a* is located. In some examples, the current location 124 may be detected within a threshold distance from the second geolocation of the transition trigger 130. In another example, the electronic device 104 may detect that the current location 124 has intersected a boundary of a predefined polygon. The predefined polygon may define a region in which the first geolocation 116*a* is located, such as a neighborhood. In other examples, the electronic device 104 may detect that the path of the electronic device 104 following the first set of graduated directions 110*a* has intersected a map feature. For example, the map feature may be a particular street that is the transition trigger 130.

Because the second geolocation of the transition trigger 130 is known, the first set of graduated directions 110*a* can be used to direct the service driver to the transition trigger 130 using the first navigation method. But, the service provider 112 may be unable to determine the service location 114 with an adequate level of confidence, and therefore it may not be possible to use the first navigation method to navigate from the transition trigger 130 to the service location 114.

At block 132, the electronic device 104 can transition from the first set of graduated directions 110*a* to a second set of graduated directions 110*b*. This can involve ceasing presentation of the first set of graduated directions 110*a*. Additionally, the electronic device 104 can present the second set of graduated directions 110*b* on the display 106. The second set of graduated directions 110*b* can be used to aid the service driver in moving from the second geolocation of the transition trigger 130 to the service location 114 using a second navigation method. The second navigation method may be distinct from the first navigation method. For example, rather than using TBT navigation, the second navigation method can involve a wayfinding navigation method. For example, the service driver may search a local area using the less detailed information in the second set of graduated directions 110*b* until the service driver locates the service location 114. The electronic device 104 can present the second set of graduated directions 110*b* and the current location 124 on the display 106 until the service driver registers a third geolocation for the service location 114.

Registering the third geolocation can provide the service provider 112 with further details for the surrounding area. As more services are performed at service locations identified using the second navigation method as part of graduated navigation, local maps may become more detailed as well. Eventually, the local area may become fully mapped, and turn-by-turn navigation may be determined and provided for any service address in the local area.

Although graduated navigation is primarily described herein as being used to deliver items to delivery addresses, graduated navigation may also be used to perform other services. For example, the electronic device 104 may be used by a delivery driver to navigate to a service location 114 to pick up a returned item from a user 118 at the service location 114. In another example, graduated navigation may be used to navigate to a campsite within a national park. For example, turn-by-turn navigation may be provided to a camper until a transition trigger 130 such as a campground entrance, a ranger station, or a landmark is reached. Then, the graduated navigation may transition to wayfinding navigation as the camper navigates to an off-road campsite. The camper can then register the location of their campsite. As campers register locations of campsites over time, a database for the campground can be updated. Thus, campers can be provided wayfinding navigation directions that include higher levels of detail, or even turn-by-turn navigation that is provided all the way to the campsites. Similar techniques may be applied to similar situations in which map data is underdeveloped within a certain region.

Further, although some examples of graduated navigation involve a first set of graduated directions 110*a* (e.g., turn-by-turn navigation) that have a higher level of detail than a second set of graduated directions 110*b* (e.g., wayfinding navigation), in some examples the opposite may be true. For example, a driver can receive a first set of graduated directions 110 that involves a relatively low level of detail, such as wayfinding, to navigate to a first geolocation 116*a*. The driver may self-navigate using wayfinding until the driver has arrived at the transition trigger 130. From that point, the graduated navigation can transition to the second set of graduated directions 110*b* that involves a higher level of detail, such as turn-by-turn navigation. This may allow users that begin navigation in an area with insufficient geographical data to eventually receive turn-by-turn navigation once they have navigated to a transition trigger 130 that is a well-known location or area.

The sets of graduated directions 110*a-b* can be presented on the display 106 of the electronic device 104 as user interfaces that update as the service driver navigates toward the service location 114. The user interfaces can also display any other information received from the service provider 112, information generated by the electronic device 104, etc. The service driver can view the sets of graduated directions 110*a-b* and additional information displayed on the user interface while driving to the service location 114. In some examples, the service driver may interact with the user interface, such as to accept a service to perform (e.g., an item delivery or pickup), to acknowledge that the service is located in an unknown area, to register a geolocation of the service, etc. Examples of the user interface are depicted and described in further detail in FIGS. 2-15.

Figure 3:
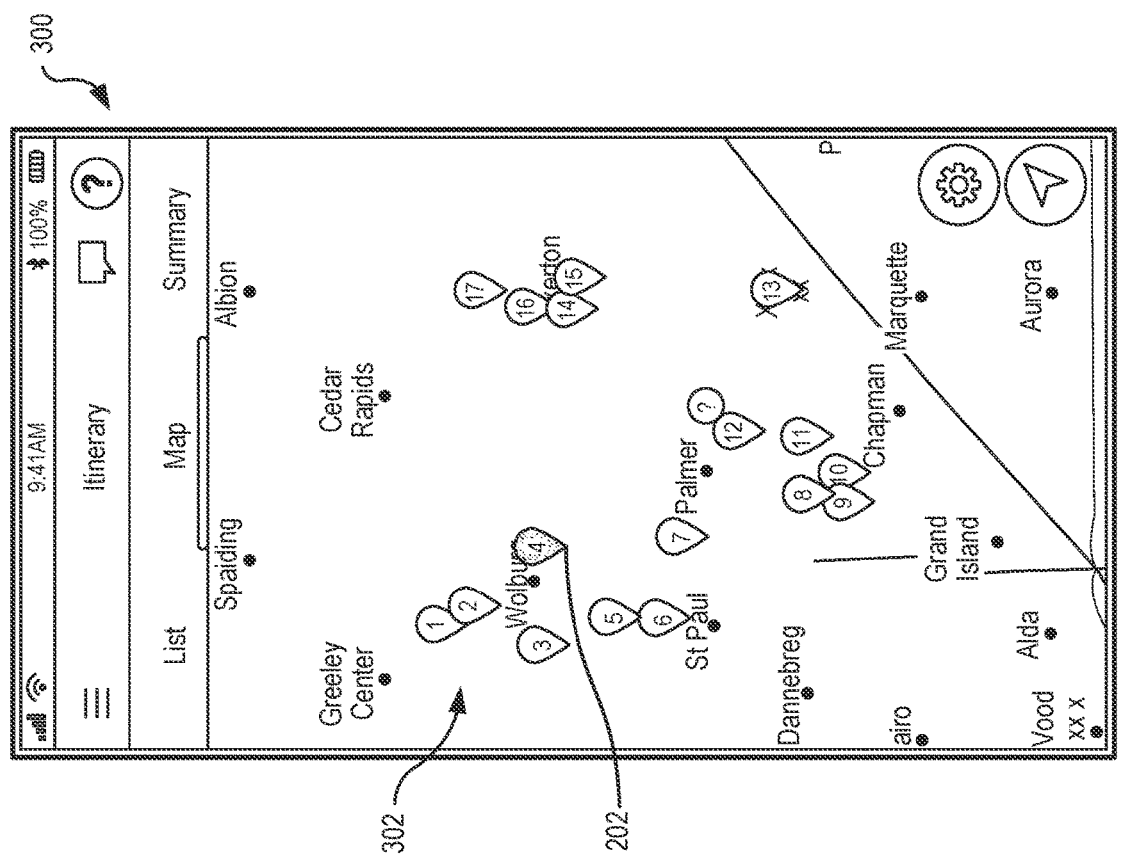
FIG. 3 illustrates an example user interface for an electronic device displaying graduated navigation, according to at least one example.
Figure 2:
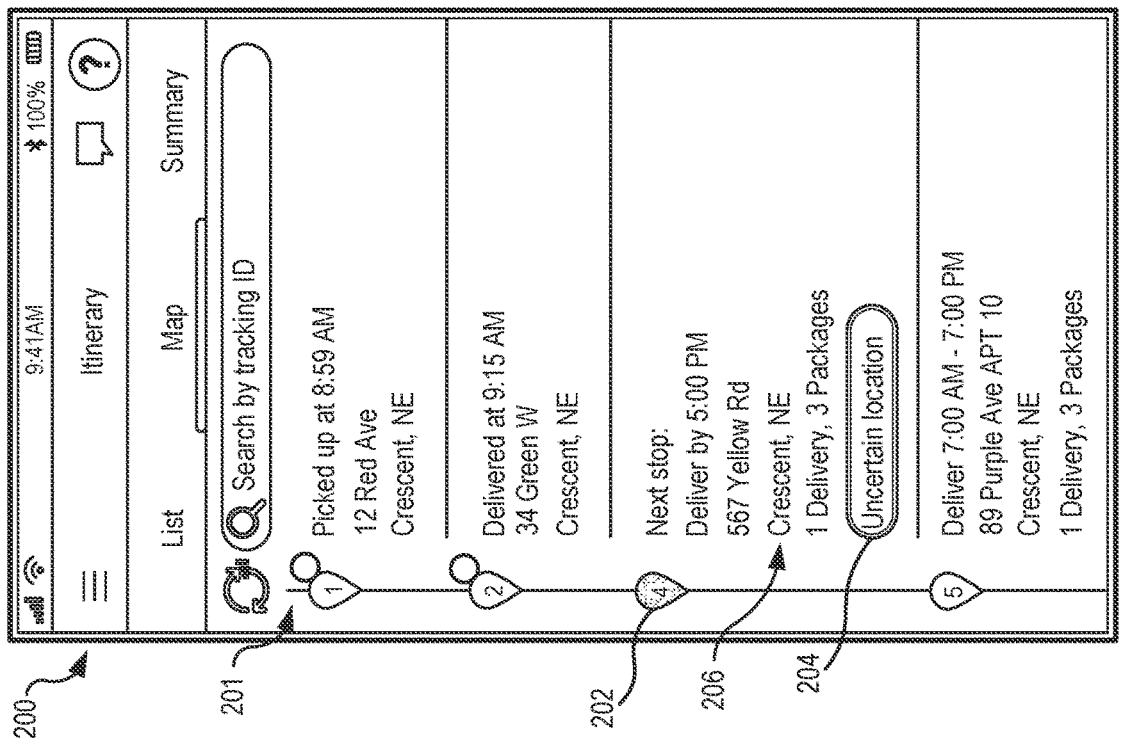
FIG. 2 illustrates an example user interface for an electronic device displaying graduated navigation, according to at least one example.

FIG. 2 illustrates an example user interface 200 on a display of an electronic device to present graduated navigation, according to at least one example. The user interface 200 depicts an itinerary 201 of deliveries for a delivery driver to accomplish. The next delivery 202 on the itinerary 201 has an indication 204 that the delivery 202 has an uncertain location. The address 206 for the delivery 202 is known, but the exact geolocation of the address 206 may not be known. Thus, graduated navigation will be used to provide both turn-by-turn and wayfinding navigation on the user interface 200. A user of the electronic device displaying the user interface 200 may view the delivery 202 in the itinerary view or on a map view. The map view is depicted in FIG. 3, which is another example user interface 300. A marker for the delivery 202 on the map 302 may be colored or shaded as an indication that the delivery 202 has an uncertain geolocation. The marker may be placed on the map 302 at a potential location of the delivery 202, but the potential location may not be accurate.

After viewing the itinerary 201 and map 302, the user may accept the delivery 202 task. In response, the electronic device displaying the user interface 300 can receive graduated directions from a remote server. The graduated directions can include a first set of directions, such as turn-by-turn navigation. The electronic device can update to display the user interface 400 illustrated in FIG. 4. User interface 400 depicts the first set of directions to display a local map 402 that includes the delivery 202. An indication 404 of the uncertain location can be displayed on the map 402. Other indications may also be displayed or outputted. For example, the electronic device may output an audible message stating that the delivery 202 has an uncertain location. Another example of an indication is displayed in FIG. 5, which illustrates another example user interface 500. The user interface 500 can include the indication 502 and the indication 404. The indications, including the indication 404, are examples of contextual information that may be presented on the user interfaces described herein.

Figure 6:
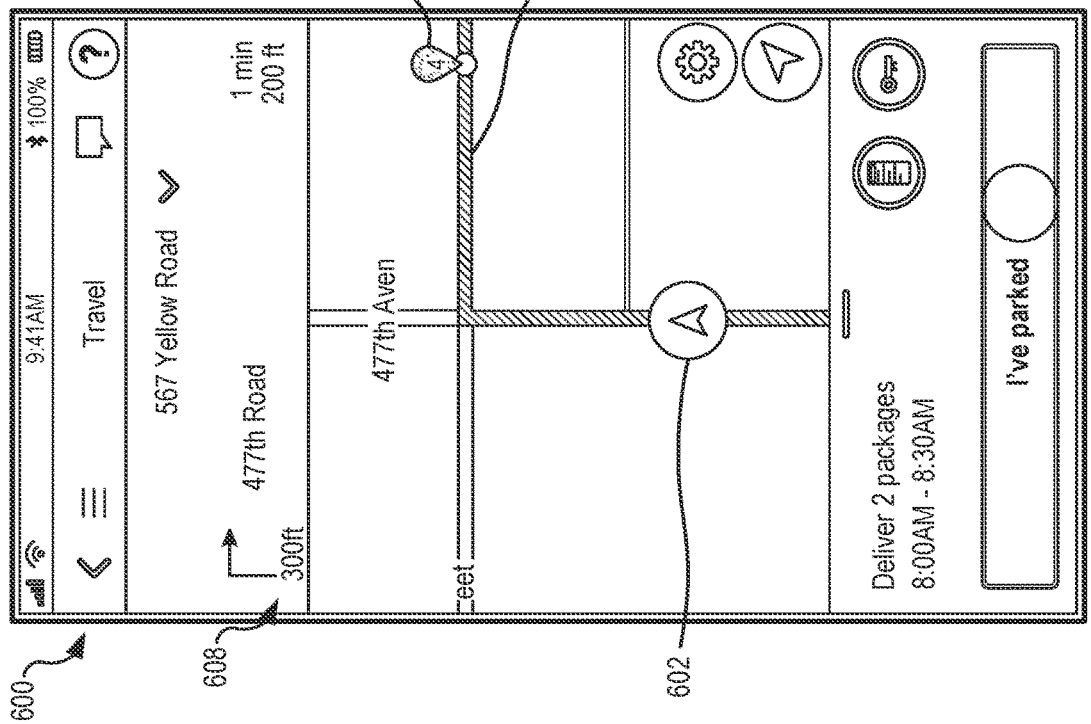
FIG. 6 illustrates an example user interface for an electronic device displaying graduated navigation, according to at least one example.

The electronic device can register that the user has accepted the displayed indications. Then, the electronic device can display user interface 600 illustrated in FIG. 6. User interface 600 can display the first set of directions from the graduated directions. The first set of directions may be relatively detailed and provide turn-by-turn instructions for the user to navigate to a location (e.g., transition trigger) near the delivery 202. An example of a turn-by-turn instruction is depicted in FIG. 6. The current location 602 is marked on the user interface 600 and can be depicted as moving along a navigation path 604 as the electronic device travels to the transition trigger 606 at the end of the navigation path 604. Directions 608 can be displayed above the navigation path 604. In this example, the directions 608 can instruct the user to turn right in 300 feet on 477$^{th}$ Road. In some examples, the turn-by-turn navigation may be accompanied by outputted audible messages that state the directions 608. The directions 608 may update for each turn along the navigation path 604 until the electronic device arrives at the transition trigger 606. For example, the location of the electronic device may be within a threshold distance from the location of the transition trigger 606, such as within 20 feet. In another example, the transition trigger 606 may include a region, and the electronic device may "arrive" at the transition trigger 606 when the current location of the electronic device intersects a boundary of the region.

Figure 7:
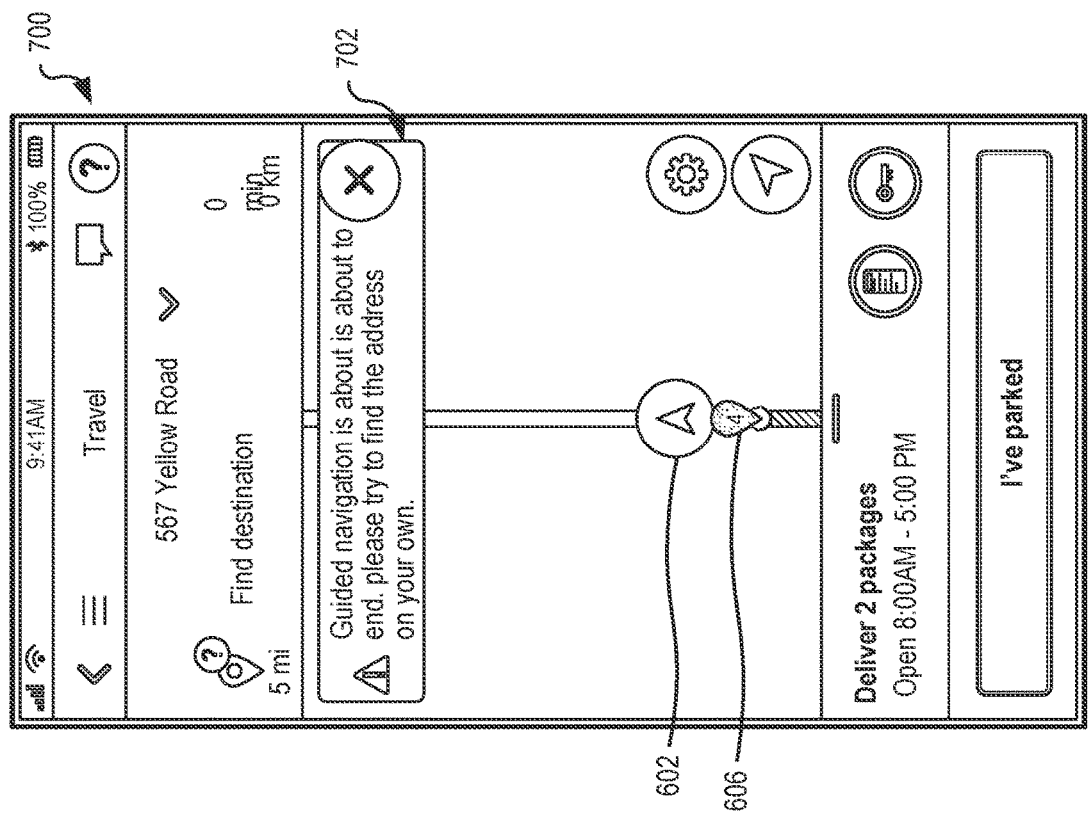
FIG. 7 illustrates an example user interface for an electronic device displaying graduated navigation, according to at least one example.

When the electronic device reaches the transition trigger 606, the electronic device can update the display to show user interface 700 illustrated in FIG. 7. The user interface 700 depicts the current location 602 at the transition trigger 606. In response to reaching the transition trigger 606, the user interface 700 can display another indication 702 that guided navigation (e.g., turn-by-turn navigation) is about to end, and that the user will need to discover the location of the delivery 202 without guided navigation. The electronic device can then transition to a second navigation method by providing the second set of directions of the graduated navigation to the user on the electronic interface. In some examples, the electronic device may output an audible message informing the user that the graduated navigation is transitioning from the first navigation method to the second navigation method.

Figure 9:
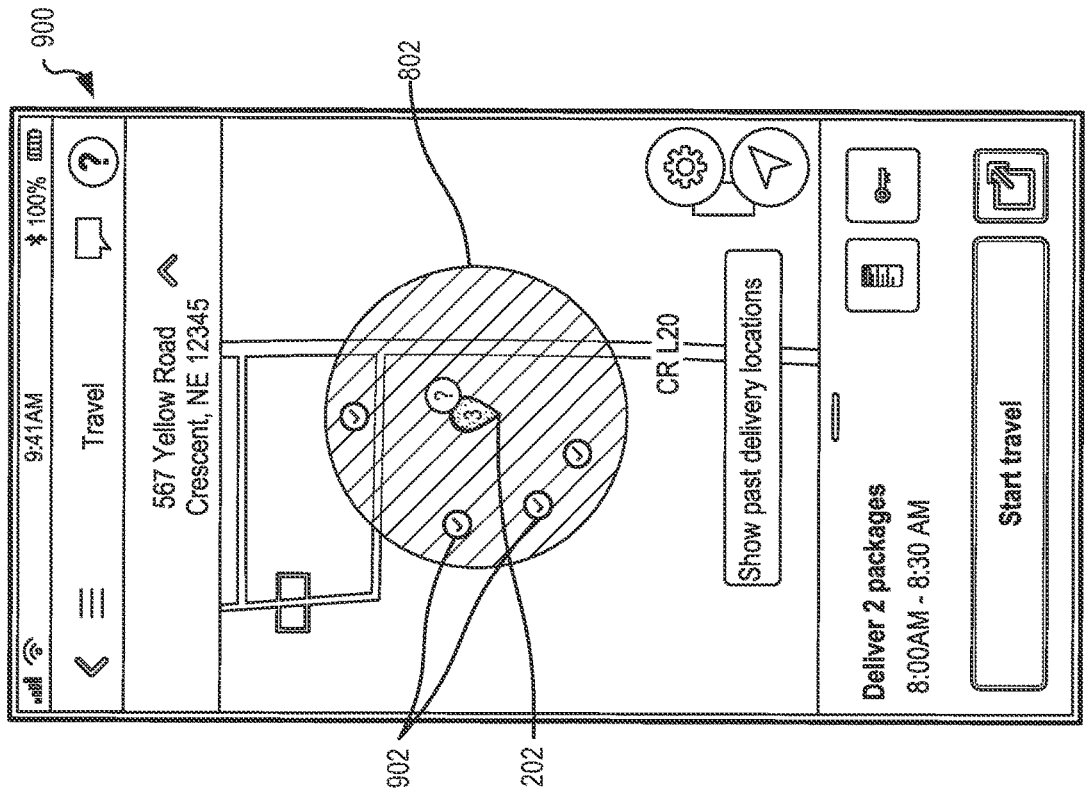
FIG. 9 illustrates an example user interface for an electronic device displaying graduated navigation, according to at least one example.
Figure 8:
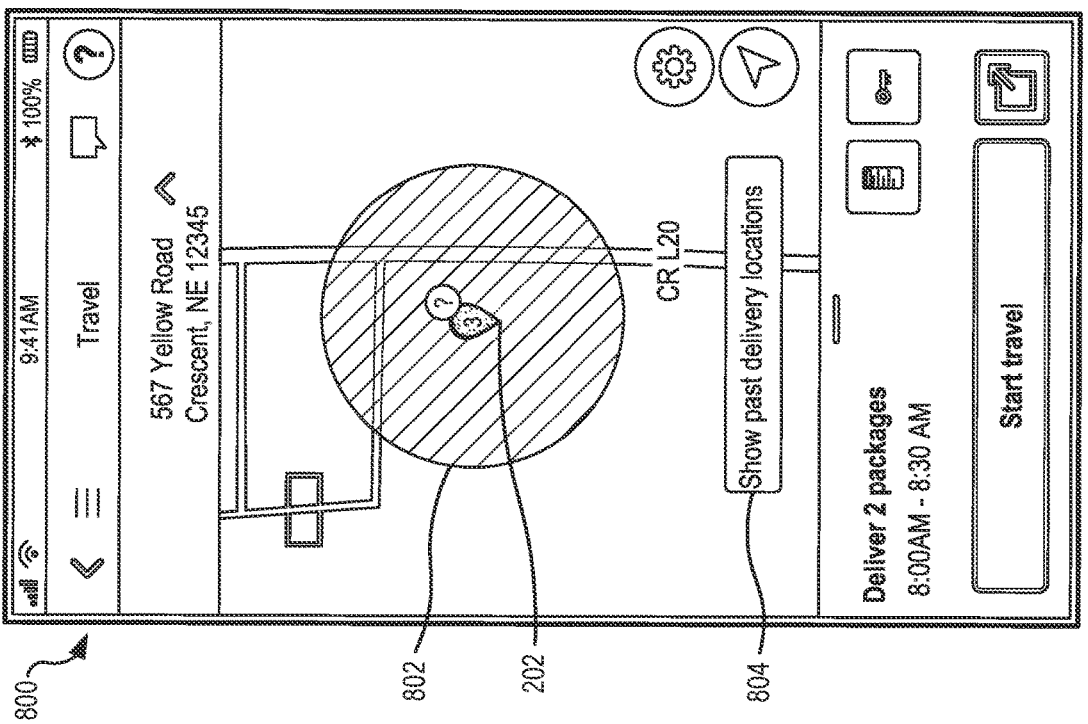
FIG. 8 illustrates an example user interface for an electronic device displaying graduated navigation, according to at least one example.
Figure 13:
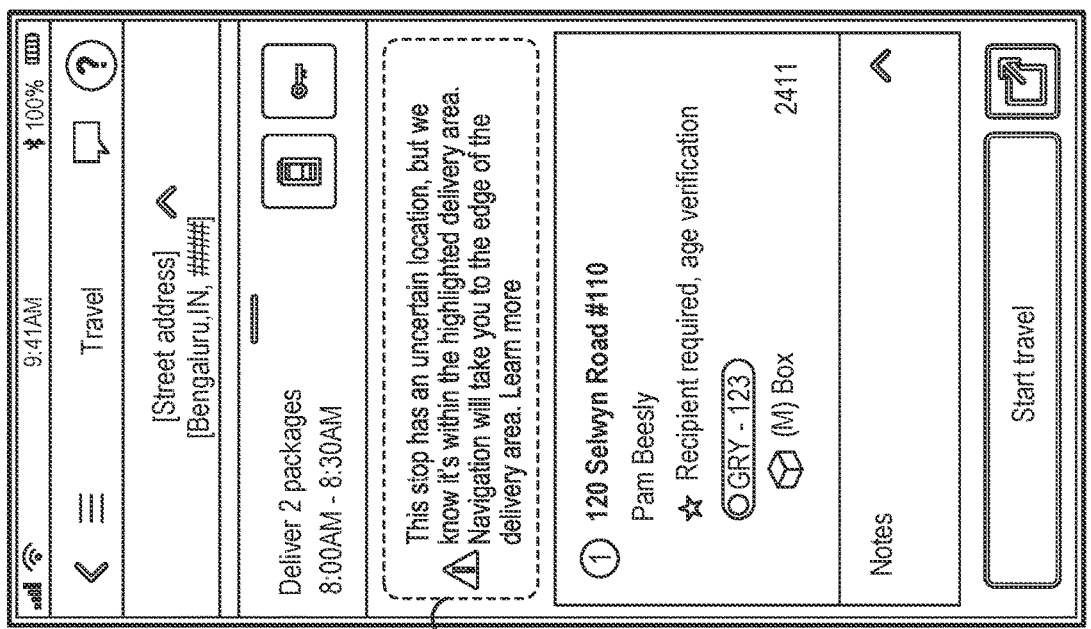
FIG. 13 illustrates an example user interface for an electronic device displaying graduated navigation, according to at least one example.

One example of the second set of directions is depicted in FIG. 8, which illustrates an example user interface 800 for the second navigation method. The user interface 800 can depict a region 802 in which the delivery 202 may be located. In some examples, the region 802 may be shaded or colored to indicate portions of the region 802 that may have a higher likelihood of including the location of the delivery 202. The user interface 800 may include a button 804 that can be toggled by the user to show past delivery locations in the region 802. FIG. 9 illustrates a user interface 900 in which the past delivery locations 902 in the region 802 are displayed. The past delivery locations 902 can be associated with delivery addresses of customers that have previously received deliveries. Each time a successful delivery is made and a location of the delivery address is registered with the service provider, the delivery address can be updated by the service provider. The service provider can then output the past delivery locations 902 to the electronic device in subsequent deliveries. The past delivery locations 902 may aid the user in identifying the location of the delivery 202 within the region 802. For example, the user interface 900 may display a past delivery location 902 associated with delivery address 565 Yellow Road. The user may identify that the delivery 202 has a similar address of 567 Yellow Road, and may determine that 567 Yellow Road is located in a building next to the past delivery location 902 with the delivery address 565 Yellow Road.

Another example of the second set of directions is depicted in FIG. 10, which illustrates an example user interface 1000 for the second navigation method. The user interface 1000 can display a highlighted road 1002 on which the delivery 202 is located. The user interface 1000 can also include an indication 1004 describing the highlighted road 1002. FIG. 11 depicts a user interface 1100 showing the highlighted road 1002 in greater detail. In some examples, the user interface 1100 may include a button 1102 that a user can toggle on to show past delivery locations 1104 on the highlighted road 1002. The past delivery locations 1104 may aid the user in identifying the location of the delivery 202 within the highlighted road 1002.

Figure 12:
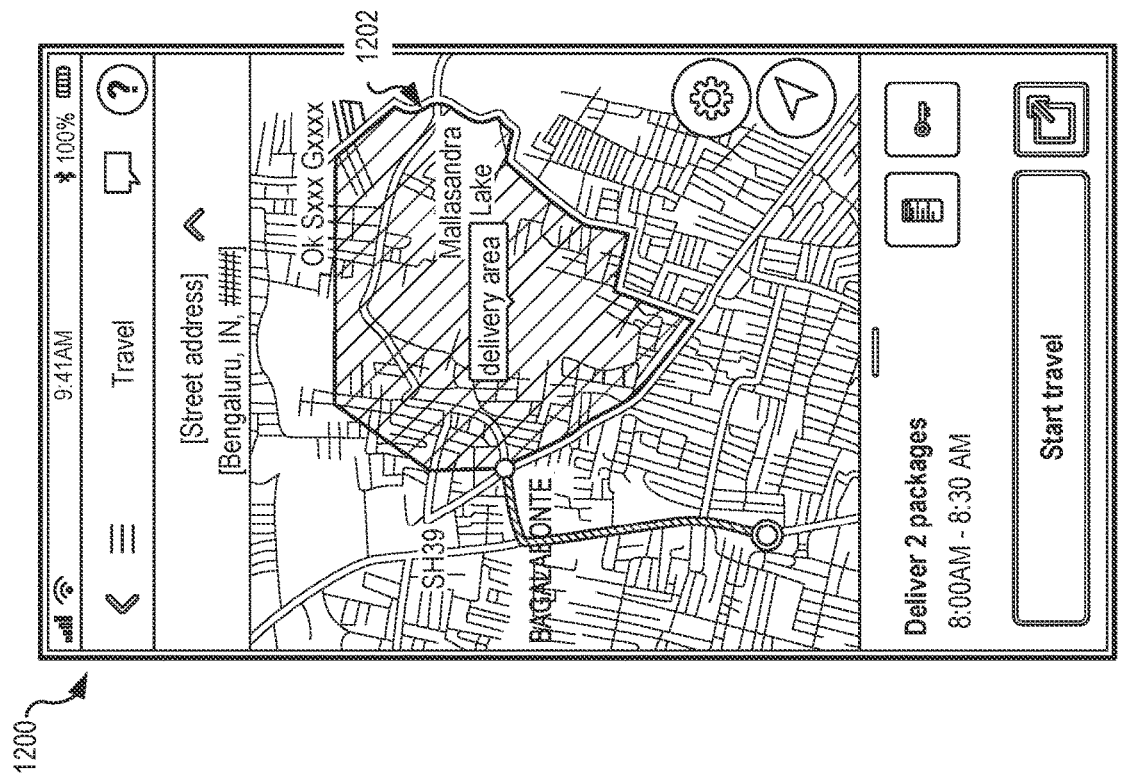
FIG. 12 illustrates an example user interface for an electronic device displaying graduated navigation, according to at least one example.

Yet another example of the second set of directions is depicted in FIG. 12, which illustrates an example user interface 1200 for the second navigation method. The user interface 1200 can display a polygon 1202 defining a region in which the delivery 202 is located. The polygon 1202 may be a neighborhood or district. The polygon 1202 may also be a region that is unmapped. The electronic device can also display a user interface 1300 depicted in FIG. 13 associated with the polygon 1202 depicted in FIG. 12. The user interface 1300 can include indication 1302 informing the user that the delivery is within the polygon 1202. For example, the indication 1302 may inform the user that the turn-by-turn navigation may take the user to the edge of the polygon 1202. When the electronic device detects that its current location has intersected a boundary of the polygon 1202, the electronic device will display the user interface as part of the second set of directions. In some examples, such as the user interface 1400 depicted in FIG. 14, multiple polygons 1402*a-c* may be depicted to a user before selecting a delivery. The regions included in the polygons 1402*a-c* may be updated using delivery address information received after the user completes the delivery 202 and registers the geolocation for the delivery 202.

Any other information relating to the delivery 202 or past nearby deliveries may be displayed to the user as part of the second set of directions. For example, FIG. 15 depicts a user interface 1500 depicting the second navigation method. The user interface 1500 can include past delivery locations 1502, parking spots 1504, directions 1506 of traffic on streets, and more. The user interface 1500 may also include pictures related to the delivery 202, such as a picture 1508 of the building entrance, or an indication of a floor level. After locating the location of the delivery 202, the user can interact with a "scan packages" button 1510 to complete the delivery. The location can be sent to a remote server to update a database comprising a map of the region. As further deliveries are completed in the area, turn-by-turn navigation may eventually be implemented for some or all parts of the area.

Figure 16:
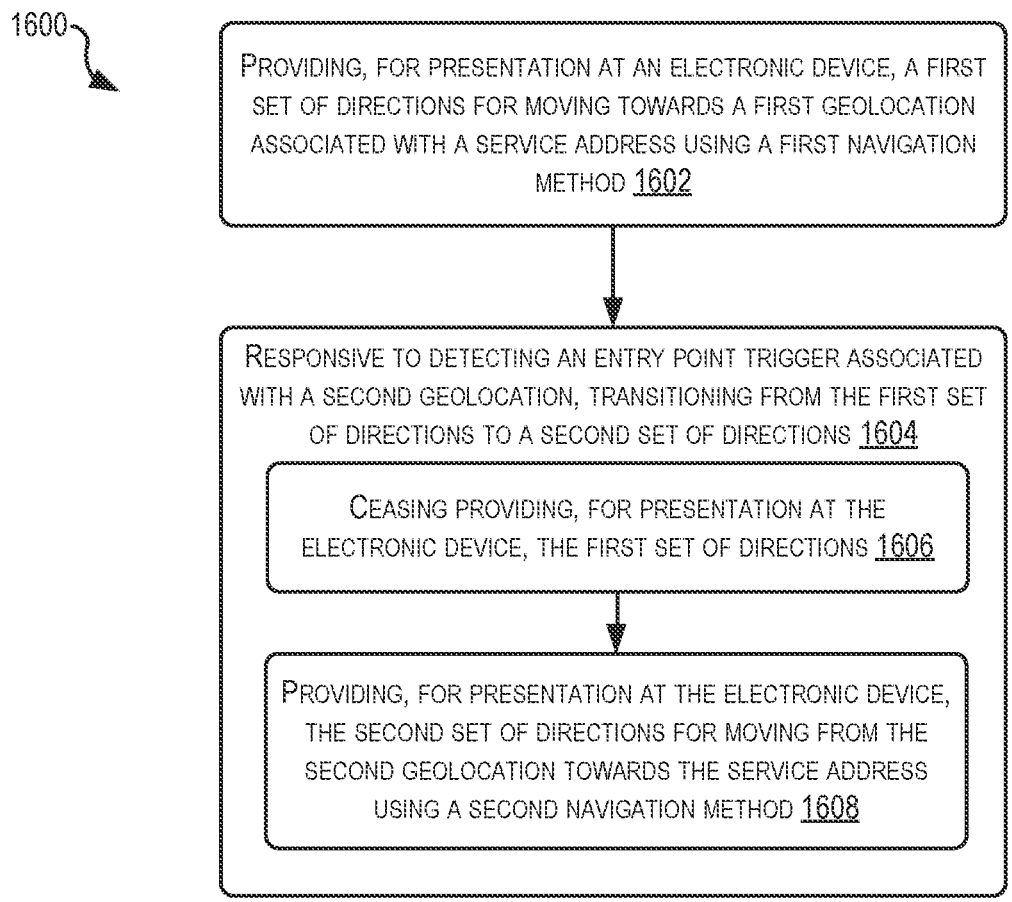
FIG. 16 illustrates an example flowchart showing a process for implementing techniques relating to graduated navigation for electronic devices, according to at least one example.

FIGS. 1 and 16 illustrate example flow diagrams showing respective processes 102 and 1600 as described herein. The processes 102 and 1600 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 16 illustrates an example flowchart showing a process 1600 for implementing techniques relating to graduated navigation for electronic devices, according to at least one example. The electronic device 104 of FIG. 1 may perform the process 1600. In some examples, the service provider 112 of FIG. 1 may perform some or all parts of the process 1600.

At block 1602, the process 1600 includes the electronic device 104 providing, for presentation at the electronic device, a first set of directions for moving towards a first geolocation associated with a service address using a first navigation method. The first set of directions may be received from a remote server such as the service provider 112. The electronic device may be at least one of a handheld user device or an electronic device onboard a service vehicle. The first geolocation may include an approximation of the service address. The first navigation method may include a turn-by-turn navigation method. In some examples, the electronic device may receive and present an indication that navigation to the service address will include graduated navigation.

At block 1604, the process 1600 includes the electronic device 104, responsive to detecting a transition trigger associated with a second geolocation, transitioning from the first set of directions to a second set of directions. Transitioning can include updating a display of the electronic device 104 with a new user interface that presents the second set of directions. The second set of directions may also be received from the remote server. The transition trigger may be detected using a current location of the electronic device. The transition trigger may be associated with at least one of an intersection, a region of interest, a point of interest, or an administrative region. Detection of the transition trigger can be defined by sets of trigger rules associated with the type of transition trigger. Different types of transition triggers can be associated with different sets of trigger rules. In an example, the second location may be associated with a polygon that defines an area that includes the first geolocation. A first set of trigger rules associated with polygons can dictate that the transition trigger (e.g., the area including the second location) is detected when a current location of the electronic device intersects a boundary of the polygon. In another example, the second location may be associated with a building with a known geolocation. A second set of trigger rules associated with points of interest can dictate that the transition trigger (e.g., the building near the second location) is detected when the current location of the electronic device is within a threshold distance, such as within 10 feet, of the known geolocation of the building. Transition between the first set of directions and the second set of directions can be accomplished by at least performing the operations of blocks 1606 and 1608.

At block 1606, the process 1600 may include ceasing providing for presentation at the electronic device, the first set of directions. In some examples, the electronic device may also output an audible message in connection with the transitioning from the first set of directions to the second set of directions. The audible message may describe the transitioning.

At block 1608, the process 1600 may include providing, for presentation at the electronic device, the second set of directions for moving from the second geolocation towards the service address using a second navigation method. The first set of directions may include a greater level of navigational detail than the second set of directions. For example, the first navigation method may be distinct from the second navigation method, which may be a wayfinding navigation method. In other examples, the second set of directions may include the greater level of navigational detail. For example, the first navigation method may be a wayfinding navigation method, and the second navigation method may be a turn-by-turn navigation method. The electronic device may display the second set of navigations to enable a user of the electronic device to navigate to the service address.

After reaching the service address, the electronic device can register a service provided related to an item at the service address. The service address may be represented by a third geolocation, discovered by the user of the electronic device as part of the second navigation method. The electronic device can then provide, to a remote server, an indication of the third geolocation to enable the remote server to associate the third geolocation with the service address.

Figure 17:
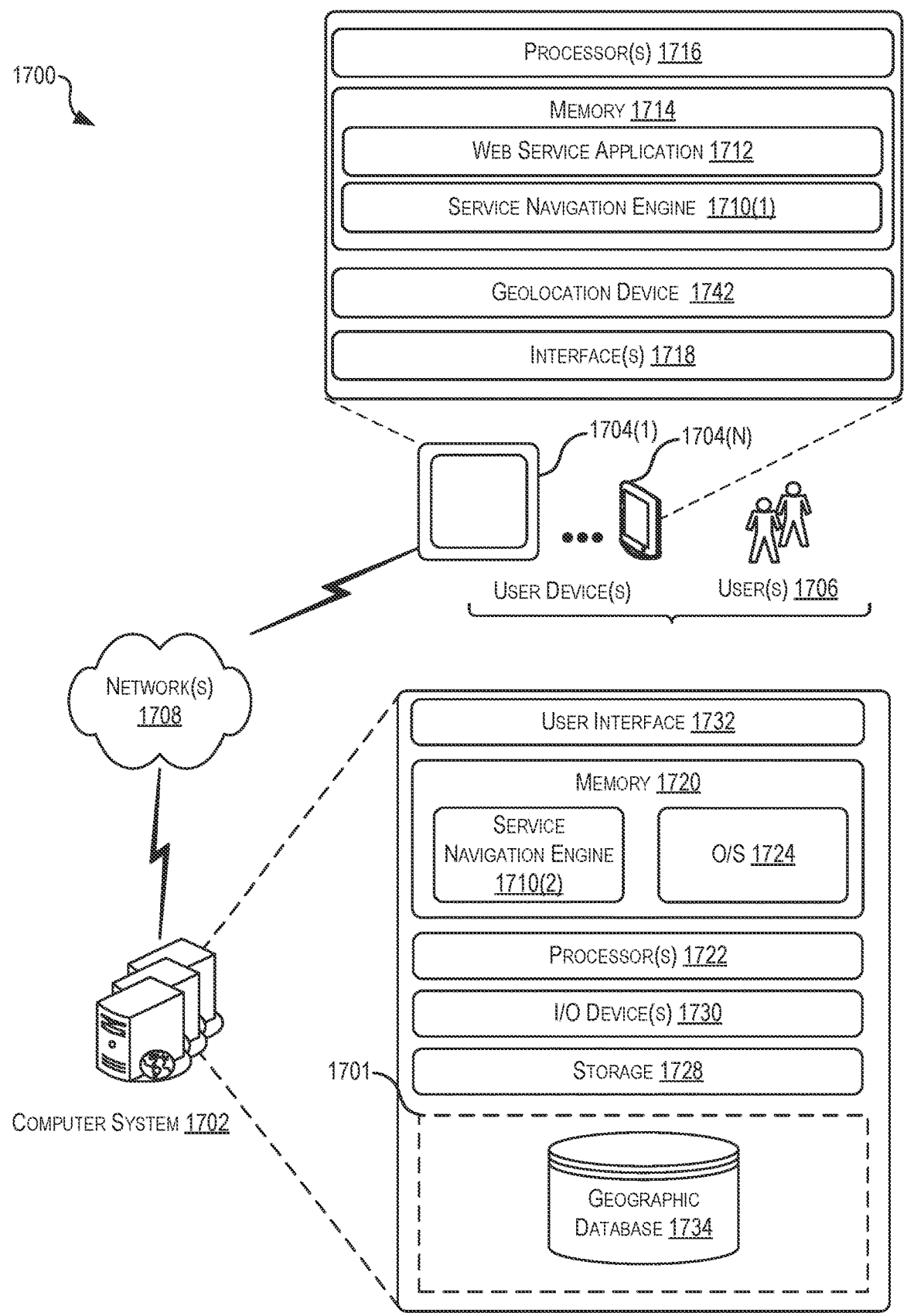
FIG. 17 illustrates an example schematic architecture for implementing techniques relating to graduated navigation for electronic devices, according to at least one example.

FIG. 17 illustrates an example schematic architecture 1700 for implementing techniques relating to graduated navigation for electronic devices, according to at least one example. The architecture 1700 may include a computer system 1702 (e.g., the service provider 112 described herein) in communication with one or more user devices 1704(1)-1704(N) (e.g., the electronic devices 104 described herein) via one or more networks 1708 (hereinafter, "the network 1708").

The user device 1704 may be operable by one or more users 1706 to interact with the computer system 1702. The users 1706 may be drivers, such as delivery drivers, that are navigating to a destination using the user device 1704. The user device 1704 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), an onboard computer, a tablet computer, etc. For example, the user device 1704(1) is illustrated as an onboard computer, while the user device 1704(N) is illustrated as an example of a handheld mobile device.

The user device 1704 may include a memory 1714 and processor(s) 1716. In the memory 1714 may be stored program instructions that are loadable and executable on the processor(s) 1716, as well as data generated during the execution of these programs. Depending on the configuration and type of user device 1704, the memory 1714 may be volatile (such as random access memory ("RAM")) and/or non-volatile (such as read-only memory (ROM), flash memory, etc.).

In some examples, the memory 1714 may include a web service application 1712 and a version of a service navigation engine 1710 (e.g., 1710(1)). The web service application 1712 and/or the service navigation engine 1710(1) may allow the user 1706 to interact with the computer system 1702 via the network 1708. The user device 1704 may also include one or more interfaces 1718 to enable communication with other devices, systems, and the like. The service navigation engine 1710, whether embodied in the user device 1704 or the computer system 1702, may be configured to perform the techniques described herein. For example, the service navigation engine 1710 can determine graduated navigation for the user 1706. The graduated navigation may involve turn-by-turn navigation that transitions into wayfinding navigation. In an example, the service navigation engine 1710 can include any other suitable devices, engines, modules, models, and the like.

The user device 1704 can include a geolocation device 1742. In some examples, the geolocation device 1742 can be communicatively coupled to the geolocation device 1742. The geolocation device 1742 can determine a current location of the user device 1704. For example, the geolocation device 1742 may use network triangulation techniques, global positioning system (GPS), Wi-Fi location positioning, cellular network positioning, RFID tracking, etc. The current location detected by the geolocation device 1742 can be displayed on the interfaces 1718. The service navigation engine 1710 can interact with the geolocation device 1742 to generate the graduated navigation for the user 1706. For example, the geolocation device 1742 can output location information related to the user device 1704 to the service navigation engine 1710. The service navigation engine 1710 can use the location information to determine a turn-by-turn route for the user 1706 as part of graduated navigation. Additionally, the service navigation engine 1710 can compare the location information to trigger rules to determine a navigation method to display on the interface 1718. For example, the service navigation engine 1710 may determine that the current location of the user device 1704 detected by the geolocation device 1742 is within a threshold distance of a transition trigger. The threshold distance may be defined by a trigger rule for the transition trigger. In response, the service navigation engine 1710 can then switch from a first navigation method involving turn-by-turn navigation to a second navigation method, such as wayfinding.

Turning now to the details of the computer system 1702, the computer system 1702 may include one or more computer system computers, perhaps arranged in a cluster of servers or as a server farm, and may host web service applications. The function of the computer system 1702 may be implemented a cloud-based environment such that individual components of the computer system 1702 are virtual resources in a distributed environment.

The computer system 1702 may include at least one memory 1720 and one or more processing units (or processor(s)) 1722. The processor 1722 may be implemented as appropriate in hardware, computer-executable instructions, software, firmware, or combinations thereof. Computer-executable instruction, software, or firmware implementations of the processor 1722 may include computer-executable or machine-executable instructions written in any suitable programming language to perform the various functions described. The memory 1720 may include more than one memory and may be distributed throughout the computer system 1702. The memory 1720 may store program instructions that are loadable and executable on the processor(s) 1722, as well as data generated during the execution of these programs. Depending on the configuration and type of memory including the computer system 1702, the memory 1720 may be volatile (such as RAM and/or non-volatile (such as read-only memory ("ROM"), flash memory, or other memory)). The memory 1720 may include an operating system 1724 and one or more application programs, modules, or services for implementing the features disclosed herein including at least a version of the service navigation engine 1710 (e.g., 1710(2)). For example, the service navigation engine 1710(2) may perform the functionality described herein.

The computer system 1702 may also include additional storage 1728, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 1728, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 1702 and/or part of the user device 1704.

The computer system 1702 may also include input/output (I/O) device(s) and/or ports 1730, such as for enabling connection with a keyboard, a mouse, a pen, a voice input device, a touch input device, a display, speakers, a printer, or other I/O device.

In some examples, the computer system 1702 may also include one or more user interface(s) 1732. The user interface 1732 may be utilized by an operator, curator, or other authorized user to access portions of the computer system 1702. In some examples, the user interface 1732 may include a graphical user interface, voice interfaces, web-based applications, programmatic interfaces such as APIs, or other user interface configurations.

The computer system 1702 may also include a data store 1701. In some examples, the data store 1701 may include one or more databases, data structures, or the like for storing and/or retaining information associated with the computer system 1702 and which, in some examples, may be accessible by the user devices 1704. The service navigation engine 1710 is communicatively coupled (e.g., via a wired connection or a wireless connection) to the data store 1701. The data store 1701 includes a geographic database 1734. In an example, the data store 1701 can include any other suitable data, databases, libraries, and the like. The geographic database 1734 can include geographic data, such as geolocations for addresses. As users 1706 identify and register geolocations of addresses, the geographic database 1734 can be modified to include the geolocations. Over time, the geographic database 1734 may include sufficient geographic data to enable turn-by-turn navigation for an entire route to a service address.

Figure 18:
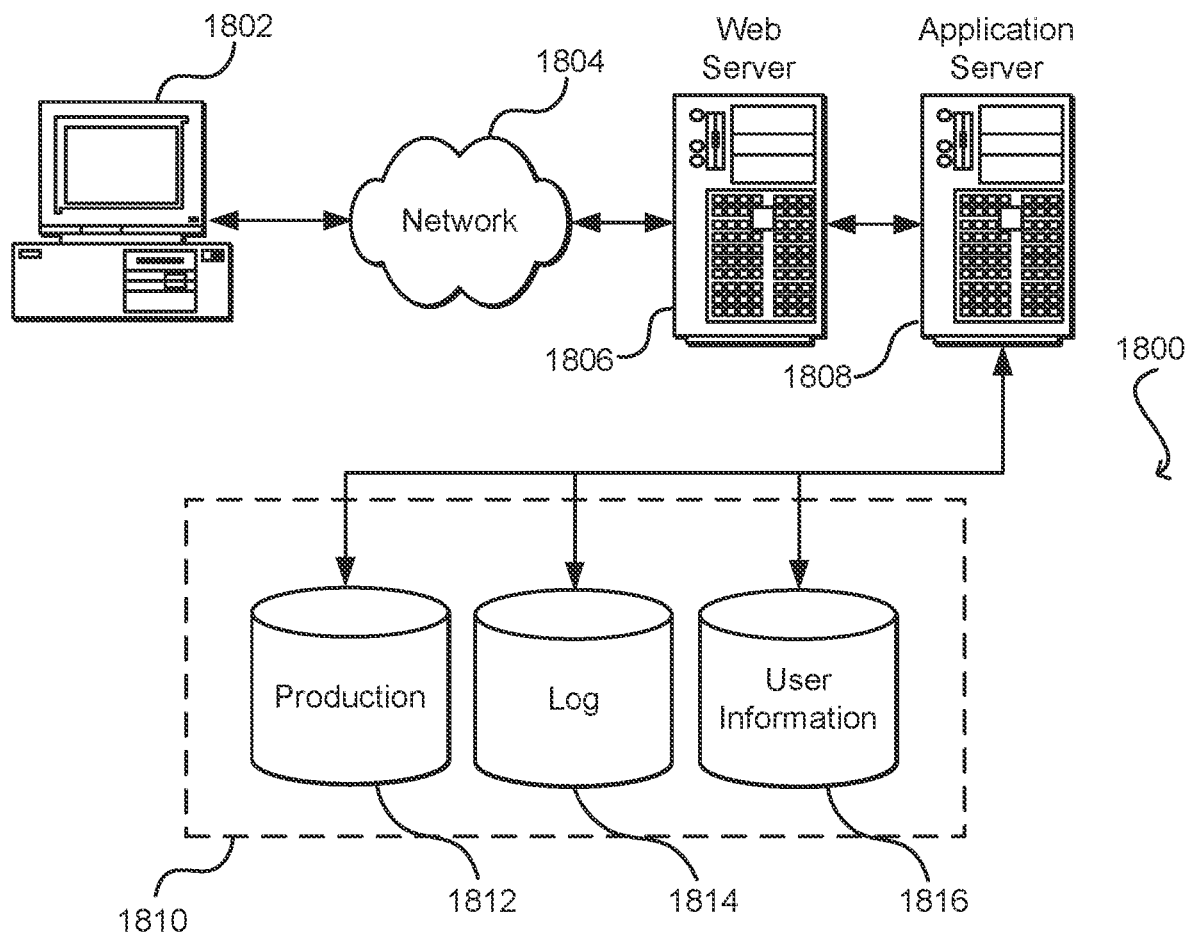
FIG. 18 illustrates an environment in which various embodiments can be implemented.

FIG. 18 illustrates aspects of an example environment 1800 for implementing aspects in accordance with various embodiments. As will be appreciated, although a Web-based environment is used for purposes of explanation, different environments may be used, as appropriate, to implement various embodiments. The environment includes an electronic client device 1802, which can include any appropriate device operable to send and receive requests, messages, or information over an appropriate network 1804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1806 for receiving requests and serving content in response thereto, although for other networks an alternative device serving a similar purpose could be used as would be apparent to one of ordinary skill in the art.

In some examples, cell phones (or, more broadly, mobile phones) may be one specific type of mobile device that is an example of the electronic client device 1802. In some instances, a user's mobile device may be considered their primary client device. Other example mobile devices include wearables, such as watches, worn sensors (e.g., rings, bracelets, etc.), cameras, eyeglasses, and the like, which may be considered "connected" auxiliary devices. In some examples, the combination of a user's primary mobile device and all or some of their connected, auxiliary devices, may make up a single mobile system configured to communicate with the Web server 1806 or other servers over the network 1804 or other networks.

The illustrative environment includes at least one application server 1808 and a data store 1810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the electronic client device 1802 and the application server 1808, can be handled by the Web server. It should be understood that the Web and application servers are not required and are merely example components, as structured code discussed herein can be executed on any appropriate device or host machine as discussed elsewhere herein.

The data store 1810 can include several separate data tables, databases or other data storage mechanisms and media for storing data relating to a particular aspect. For example, the data store illustrated includes mechanisms for storing production data 1812 and user information 1816, which can be used to serve content for the production side. The data store also is shown to include a mechanism for storing log data 1814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1810. The data store 1810 is operable, through logic associated therewith, to receive instructions from the application server 1808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 1802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the environment 1800 in FIG. 18 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An electronic device, comprising:
a display;
a geolocation device;
a memory configured to store computer-executable instructions; and
a processor configured to access the memory and execute the computer-executable instructions to at least:
receive, from a remote server, graduated directions for navigating to a service location for providing a service relating to an item for a user, the service location associated with a first geolocation;
provide, for presentation on the display, a first set of graduated directions of the graduated directions, the first set of graduated directions for navigating towards the first geolocation using a first navigation method;
determine a current location of the electronic device using the geolocation device;
detect a transition trigger using the current location of the electronic device, the transition trigger being associated with a second geolocation; and
responsive to detecting the transition trigger, transition from the first set of graduated directions to a second set of graduated directions of the graduated directions by at least:
ceasing providing, for presentation at the display, the first set of graduated directions; and
providing, for presentation at the display, the second set of graduated directions for moving from the second geolocation towards the service location using a second navigation method.

2. The electronic device of claim 1, wherein the transition trigger is associated with at least one of an intersection, a region of interest, a point of interest, or an administrative region.

3. The electronic device of claim 1, wherein detecting the transition trigger using the current location of the electronic device comprises at least one of (i) detecting that the current location is within a threshold distance from the first geolocation, (ii), detecting that the current location is within a predefined polygon, or (iii) detecting that a path of the electronic device intersected a map feature.

4. The electronic device of claim 1, wherein the first navigation method comprises one of a turn-by-turn navigation method or a wayfinding navigation method, and the second navigation method comprises one of the wayfinding navigation method or the turn-by-turn navigation method.

5. The electronic device of claim 1, wherein the memory is configured to store additional computer-executable instructions, and the processor is configured execute the additional computer-executable instructions to at least, prior to providing the first set of graduated directions, provide, for presentation at the display, a contextual message indicating that navigation to the service location will include the graduated directions.

6. A computer-implemented method, comprising:
providing, for presentation at an electronic device, a first set of directions for moving towards a first geolocation associated with a service address using a first navigation method; and
responsive to detecting a transition trigger associated with a second geolocation, transitioning from the first set of directions to a second set of directions by at least:
ceasing providing, for presentation at the electronic device, the first set of directions; and providing, for presentation at the electronic device, the second set of directions for moving from the second geolocation towards the service address using a second navigation method.

7. The computer-implemented method of claim 6, wherein the first geolocation comprises an approximation of the service address.

8. The computer-implemented method of claim 7, further comprising:
registering a service of an item at the service address represented by a third geolocation; and
providing, to a remote server, an indication of the third geolocation to enable the remote server to associate the third geolocation with the service address.

9. The computer-implemented method of claim 6, further comprising detecting the transition trigger using a current location of the electronic device.

10. The computer-implemented method of claim 9, wherein the transition trigger is associated with at least one of an intersection, a region of interest, a point of interest, or an administrative region.

11. The computer-implemented method of claim 6, further comprising receiving the first set of directions and the second set of directions from a remote server.

12. The computer-implemented method of claim 6, wherein the first navigation method is distinct from the second navigation method.

13. The computer-implemented method of claim 6, wherein the electronic device comprises at least one of a handheld user device or an electronic device onboard a service vehicle.

14. The computer-implemented method of claim 6, wherein the transition trigger is associated with a first set of trigger rules, wherein detecting the transition trigger comprises detecting in accordance with the first set of trigger rules, and wherein other transitions are associated with other sets of trigger rules.

15. The computer-implemented method of claim 6, wherein the first navigation method comprises a wayfinding navigation method, and the second navigation method comprises a turn-by-turn navigation method.

16. The computer-implemented method of claim 6, further comprising outputting an audible message in connection with transitioning from the first set of directions to the second set of directions, the audible message describing the transitioning.

17. The computer-implemented method of claim 6, further comprising receiving an indication that navigation to the service address will include graduated directions.

18. One or more non-transitory computer-readable storage media comprising computer-executable instructions that, when executed by one or more processors of an electronic device, cause the electronic device to perform operations comprising:
providing, for presentation at the electronic device, a first set of directions for moving towards a first geolocation associated with a service address using a first navigation method; and
responsive to detecting a transition trigger associated with a second geolocation, transitioning from the first set of directions to a second set of directions by at least:
ceasing providing, for presentation at the electronic device, the first set of directions; and
providing, for presentation at the electronic device, the second set of directions for moving from the second geolocation towards the service address using a second navigation method.

19. The one or more non-transitory computer-readable storage media of claim 18, wherein the second geolocation is associated with a polygon that defines an area that includes the first geolocation, and wherein detecting the transition trigger comprises detecting an intersection of a boundary of the polygon.

20. The one or more non-transitory computer-readable storage media of claim 18, wherein the first set of directions comprise a greater level of navigational detail than the second set of directions.

* * * * *